(12) United States Patent
Li et al.

(10) Patent No.: US 8,228,047 B2
(45) Date of Patent: *Jul. 24, 2012

(54) POWER CONVERTERS HAVING VARIED SWITCHING FREQUENCIES

(75) Inventors: Li Li, San Jose, CA (US); Ronil D. Patel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 12/750,297

(22) Filed: Mar. 30, 2010

(65) Prior Publication Data

US 2010/0181832 A1  Jul. 22, 2010

Related U.S. Application Data

(63) Continuation of application No. 11/188,325, filed on Jul. 25, 2005, now Pat. No. 7,688,046.

(51) Int. Cl.
G05F 1/563 (2006.01)

(52) U.S. Cl. ......... 323/266; 323/65; 323/282; 323/299; 307/66

(58) Field of Classification Search ................ 323/224, 323/235, 265, 266, 272, 299, 65, 282; 307/31, 307/66

See application file for complete search history.

(56) References Cited

U.S. PATENT DOCUMENTS

| | | | |
|---|---|---|---|
| 5,132,606 A | | 7/1992 | Herbert |
| 5,444,356 A | * | 8/1995 | Reynolds et al. ............. 323/282 |
| 5,642,267 A | * | 6/1997 | Brkovic et al. ................ 363/16 |
| 6,188,206 B1 | * | 2/2001 | Nguyen et al. ................ 323/222 |
| 6,271,651 B1 | | 8/2001 | Stratakos et al. |
| 6,304,066 B1 | | 10/2001 | Wilcox et al. |
| 6,476,589 B2 | | 11/2002 | Umminger et al. |
| 6,696,882 B1 | | 2/2004 | Markowski et al. |
| 6,707,271 B2 | | 3/2004 | Kitagawa |
| 6,856,525 B2 | * | 2/2005 | Wallis .............................. 363/59 |
| 7,026,800 B2 | | 4/2006 | Liu et al. |
| 7,071,660 B2 | * | 7/2006 | Xu et al. ........................ 323/266 |
| 7,148,660 B2 | | 12/2006 | Ghosh et al. |
| 7,161,335 B2 | | 1/2007 | Wei et al. |
| 7,256,570 B2 | | 8/2007 | Zhou et al. |
| 7,298,119 B1 | | 11/2007 | Amram Summit et al. |
| 7,595,619 B2 | * | 9/2009 | Vieira Formenti ............ 323/282 |
| 8,097,981 B2 | * | 1/2012 | Shimada et al. ................ 307/66 |
| 2004/0123167 A1 | | 6/2004 | Chapuis |
| 2008/0157732 A1 | * | 7/2008 | Williams ....................... 323/266 |

OTHER PUBLICATIONS

Kevin Kettler, Ph.D., Technology Trends in Computer Architecture and Their Impact on Power Subsystems, 2005, IEEE APEC Conference Rec., pp. 7-10.

James W. Davis, Power Electronics in Computing: From Notebooks to Workstations, 1993, IEEE ISPSD Conference Rec., pp. 12-15.

Joe F. Barta, Power Managing Pentium Processor-Based Notebooks, 1994, IEEE WESCON Conference Rec., pp. 299-302.

(Continued)

*Primary Examiner* — Tho G Phan
(74) *Attorney, Agent, or Firm* — Fish & Richardson P.C.

(57) ABSTRACT

Systems and techniques for performing power conversion operations in a portable device are used to convert an input voltage to a voltage at an output. The conversion operations use a two-stage conversion to convert the input voltage to a first voltage and to convert the first voltage to a second voltage. A switching frequency is altered with changes in the input voltage. The switching frequency is selected based on the input voltage level and/or to maintain a substantially consistent ripple at the output, which can correspond to the first voltage and/or the second voltage.

22 Claims, 3 Drawing Sheets

OTHER PUBLICATIONS

Yung-Hsiang Lu and Giovanni De Micheli, Comparing System-Level Power Management Policies, Mar.-Apr. 2001, IEEE Design & Test of Computers, vol. 18, Issue 2, pp. 10-19.

A. Soto, P. Alou, J.A. Cobos, and J. Uceda, The Future DC-DC Converter as an Enabler of Low Energy Consumption Systems with Dynamic Voltage Scaling, 2002, Proc. IEEE IECON Conference Rec., pp. 3244-3249.

Barry Arbetter, Robert Erickson, and Dragan Maksimovic, DC-DC Converter Design for Battery-Operated Systems, 1995, Proc. IEEE WESCON Conference Rec., pp. 103-109.

James J. Locascio and William Cho, New IC's and Control Techniques for Battery Powered Systems, 1993, Proc. IEEE WESCON Conference Rec., pp. 388-395.

Xunwei Zhou, Mauro Donati, Luca Amoroso, and Fred C. Lee, Improved Light-Load Efficiency for Synchronous Rectifier Voltage Regulator Module, Sep. 2000, IEEE Trans. Power Electron, vol. 15, pp. 826-834.

Fred C. Lee, Peter Barbosa, Peng Xu, Jindong Zhang, Bo Yang, and Francisco Canales, Topologies and Design Considerations for Distributed Power System Applications, Jun. 2001, Proc. Of IEEE, vol. 89, Issue 6, pp. 939-950.

Jia Wei and Fred C. Lee, Two-Stage Voltage Regulator for Laptop Computer CPUs and the Corresponding Advanced Control Schemes to Improve Light-Load Performance, 2004, Proc. IEEE APEC Conference Rec., pp. 1294-1300.

Yuancheng Ren, Ming Xu, Kaiwei Yao, Yu Meng, Fred C. Lee, and Jinghong Guo, Two-State Approach for 12V VR, 2004, Proc. IEEE APEC Conference Rec., pp. 1306-1312.

Chung-Hsien Tso and Jiin-Chuan Wu, A Ripple Control Buck Regulator with Fixed Output Frequency, Sep. 2003, IEEE Power Electronics Letters, vol. 1, Issue 3, pp. 61-63.

Terry L. Cleveland, Bi-Directional Power System for Laptop Computers, 2005, Proc. IEEE APEC Conference Rec., pp. 199-203.

Intel, Narrow VDC Extended Battery Life (EBL) Technique, Sep. 2003, pp. 1-17.

O2Micro International Limited, Ultra High Efficiency Dual DC-DC Controller, © 2004-2005, pp. 0-25.

O2Micro International Limited, User Guide for OZ813—Ultra High Efficiency Dual DC-DC Controller Demonstration Kit, © 2005, pp. 1-31.

* cited by examiner

POWER CONVERTERS HAVING VARIED SWITCHING FREQUENCIES

CROSS-REFERENCE TO RELATED APPLICATION

This application is a continuation application of and claims priority to U.S. application Ser. No. 11/188,325, filed on Jul. 25, 2005, the entire disclosure of which is incorporated herein by reference.

TECHNICAL FIELD

This description relates to improving efficiency of battery-powered devices, and more particularly to two-stage power converters that use varying switching frequencies.

BACKGROUND

Notebook computers and other portable devices that require power for operation use batteries for portable use and a direct current (DC) adapter when connected to an alternating current (AC) power source. A typical battery for a notebook computer is a three-series or four-series cell lithium-ion battery. Each cell has an operating range from 3.0-4.2 V. Thus, a fully charged battery with four-series cells has a maximum voltage of 16.8 V. As the device consumes power, the battery discharges from 16.8 V to 12.0 V. Generally, when the device is connected to an AC power source, the AC voltage is converted to a DC voltage using a DC adapter. The DC voltage can be used both to power the device and to recharge the battery.

During a battery discharge period, the rate of power dissipation affects thermal performance and impacts the duration of operation before recharging is required. Accordingly, reducing power dissipation during battery discharge can improve thermal performance and provide longer operating times with the same battery volume.

SUMMARY

Techniques for improving power efficiency through decreased switching losses can be implemented by altering a switching frequency of a power converter in a battery-powered or portable device as input voltage varies. In particular, when the device switches from a constant-level power supply to battery power and as the battery power is depleted, the switching frequency can be reduced to reduce power dissipation. Power savings can be further increased and other benefits can be achieved using such techniques with a two-stage power converter. Among other things, such power savings promote longer battery life between recharging operations and result in better thermal performance.

In one general aspect, an input voltage is converted to a voltage at an output using a two-stage conversion to convert the input voltage to a first voltage and to convert the first voltage to a second voltage. A switching frequency is altered with changes in the input voltage to maintain a substantially consistent ripple at the output.

Implementations can include one or more of the following features. The switching frequency is altered in response to a detected change in the input voltage and/or in response to a detected change in the ripple at the output. The switching frequency is altered by decreasing the switching frequency with decreases in the input voltage and/or based on a load (e.g., a current draw) at the output. The voltage at the output can be the first voltage or the second voltage. The input voltage varies according to a charge of a battery, the first voltage and the second voltage are maintained at a substantially constant level, and the first voltage has a higher level than the second voltage. Multiple power converters are used to convert the first voltage to multiple secondary voltages, and each secondary voltage is adapted to power one or more components. A substantially constant voltage is maintained at the output by varying a duty cycle associated with the switching frequency. The switching frequency is altered within a range of switching frequencies as the input voltage changes with a battery charge, and a constant switching frequency different from the range of switching frequencies is maintained when maintaining the input voltage at a constant level using a constant-level power source.

In another general aspect, a change in a power supply level is detected, and a switching frequency of a power converter is changed in response to the detected change in the power supply level. The power converter includes a two-stage power converter operable to convert the power supply level to a voltage level at a first output and to convert the first output voltage level to a voltage level at a second output.

Implementations can include one or more of the following features. The power supply level is a voltage, and the power supply is a battery. A determination is made whether a device powered by the power supply is operating using battery power or using a constant-level power source. The switching frequency of the power converter is controlled within a first range of switching frequencies when the device is operating using battery power. One or more switching frequencies different from the first range of switching frequencies are activated when the device is operating using a constant-level power source. The switching frequency is changed to maintain a ripple level at an output of the power converter below a threshold level, and the output is the first output or the second output. The power converter is operable to produce substantially constant voltages at each of the first output and the second output with changes in the power supply level.

In another general aspect, an output terminal powers one or more components of a portable device. A variable switching frequency power converter converts a voltage at an input terminal to an intermediate voltage, and a switching frequency of the variable switching frequency power converter corresponds to the voltage level at the input terminal. A second stage power converter converts the intermediate voltage to produce an output voltage at the output terminal.

Implementations can include one or more of the following features. The portable device operates using battery power applied to the input terminal. The power converter is a buck regulator with discrete transistors. The second stage power converter is a monolithic buck regulator, whereby the transistors are integrated on-chip.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
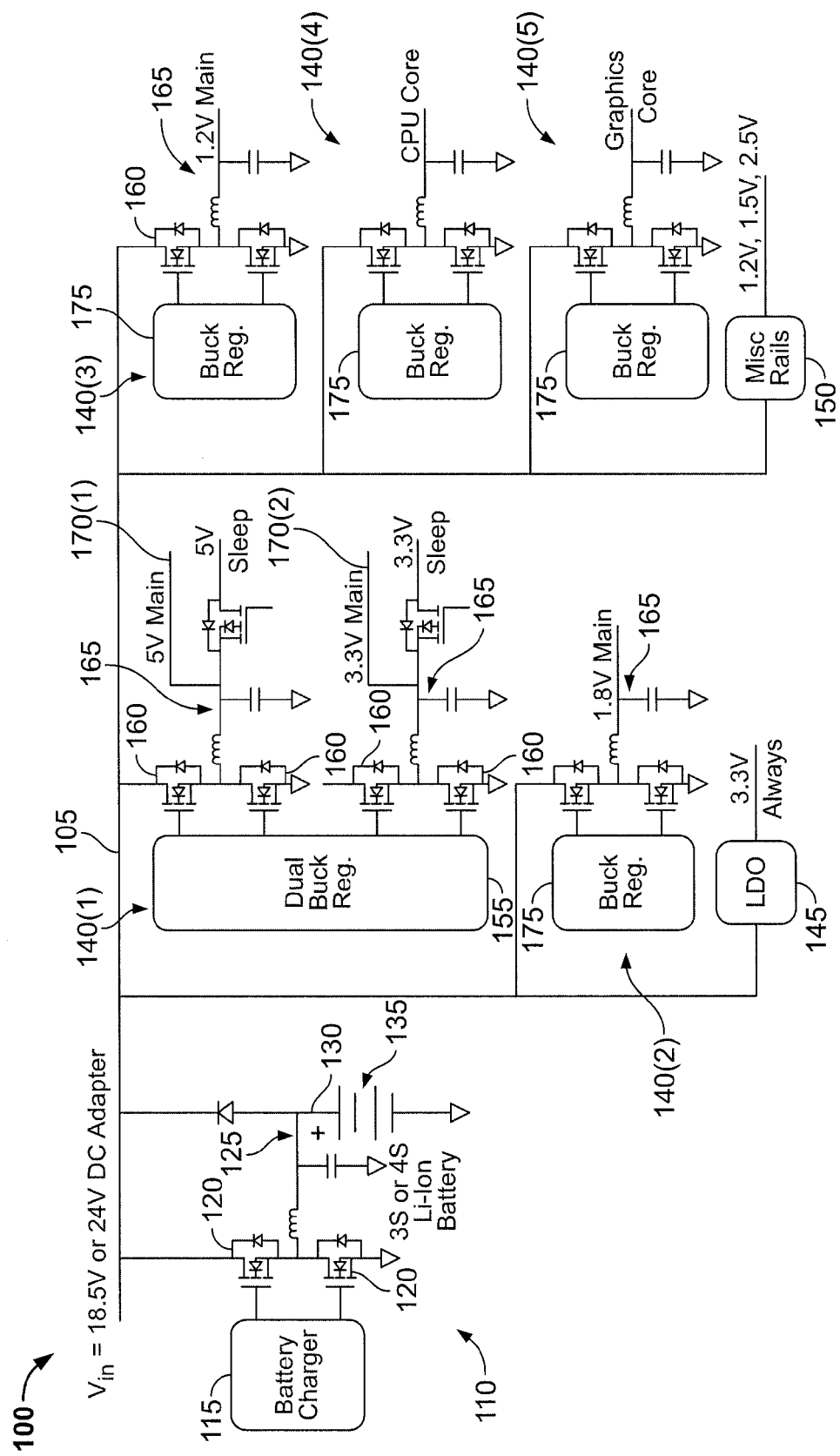
FIG. 1 is a block diagram of a conventional power converter system for a typical notebook computer.

FIG. 1 is a block diagram of a conventional power converter system 100 for a typical notebook computer. Similar power converter circuits can be used to power other types of notebook computers, mobile telephones, PDAs, portable gaming devices, radios, GPS receivers, and any other portable or battery-powered devices. The power converter system 100 includes an input voltage rail 105. When the power converter system 100 is connected to an AC power source (not shown), a DC adapter (not shown) can be used to provide, for example, 18.5 V or 24 V on the input voltage rail 105. The DC voltage on the input voltage rail 105 can be used in connection with a battery charger circuit 110 that includes a battery charger controller 115 for controlling field effect transistors (FETs) 120. The FETs and an LC filter 125 in combination provide a controlled and relatively constant voltage at a positive terminal 130 of a three or four cell lithium-ion battery 135, which serves to charge the battery 135.

When the power converter system 100 is not connected to an AC power source, the battery provides power to the input voltage rail 105. For a typical three-cell battery 135, the maximum battery voltage is roughly 12.6 V, and, for a typical four-cell battery 135, the maximum battery voltage is roughly 16.8 V. As the battery is depleted over time, the voltage gradually and continuously decreases to a predetermined minimum level, which is considered to be an empty battery 135. For a typical three-cell battery 135, the minimum battery voltage is roughly 9.0 V, and, for a four-cell battery 135, the minimum battery voltage is roughly 12.0 V.

The input voltage rail 105 provides power to multiple buck converters 140, one or more low dropout (LDO) linear regulators 145, and one or more other power converters 150. Each power converter 140, 145, and 150 provides a reduced voltage power supply to one or more components (not shown) of the notebook computer or other device. In the illustrated example, one buck converter 140(1) includes a dual buck regulator 155, two pairs of FETs 160, and two LC filters 165. The dual buck regulator 155 controls a pulse width modulation using the FETs 160 to perform on and off switching and to thereby regulate voltage supplied to output rails 170(1) and 170(2). The dual buck regulator 155 varies the duty cycle of the pulses depending on the voltage level on the input voltage rail 105 and on the desired voltage to be provided on the respective output rails 170(1) and 170(2). Thus, the duty cycle increases when the power supply switches from an AC power source to battery power and further increases as the charge on the battery decreases to maintain a consistent average output voltage.

As each part of the dual buck regulator 155 is switched on and off, the LC filters 165 serve to smooth the square voltage to produce an average voltage that approximates a DC voltage. The combination of the LC filter 165 and a particular switching frequency are selected to produce an acceptably small voltage and/or current ripple on the output rail 170(1) or 170(2). Generally, larger components in the LC filter 165 produce a smaller ripple but increase cost and result in increased power loss. Similarly, higher switching frequencies produce a smaller ripple but also result in increased power loss due to switching. In general, switching losses are roughly proportional to switching frequency. The size of the components in the LC filter 165 and the switching frequency can be selected to provide relatively improved efficiency. For example, a switching frequency of approximately 300 or 400 KHz may provide a desirable balance between the size of components and the applicable switching losses.

The first buck converter 140(1) in this example provides 5 V on a first output rail 170(1) and 3.3 V on a second output rail 170(2). Each output rail 170(1) and 170(2) is used to provide power to components of the notebook computer or other device that have different power requirements (i.e., components that require different voltage level inputs). Other buck converters 140(2), 140(3), 140(4), and 140(5), which may include single, rather than dual, buck regulators 175, FETs 160, and LC filters 165, are used to provide power to still other components that have other power requirements (e.g., 1.8 V, 1.2 V, a CPU core voltage, and a graphics processor core voltage). Other power converters, such as the LDO linear regulator 145 and other power converters 150 can be used to satisfy other voltage and/or current requirements of additional components included in the notebook computer or other device.

Conventional power converters use the same switching frequency regardless of the voltage level on the input voltage rail 105. To provide relatively improved power efficiency, it is possible to use power converters with variable switching frequencies. By changing the switching frequency depending upon the input voltage, switching losses can be decreased without negatively impacting ripple levels at the output of the power converters. In particular, as the input voltage decreases, the switching frequency can also be decreased to maintain approximately the same ripple level. By reducing power dissipation due to switching losses, thermal performance can be improved (e.g., by reducing heat generation) and longer operating times can be provided with the same battery volume.

For example, when the input voltage rail 105 is powered by an AC power source (e.g., resulting in a 24 V input), a switching frequency of 400 KHz is used. When the power source switches to a fully charged battery (e.g., providing a 16 V input), the switching frequency can be changed to 300 KHz. This lower switching frequency may provide substantially the same output ripple level as a 400 KHz switching frequency for a 24 V input or may provide a different output ripple level but a ripple that is below an acceptable threshold level. The values given are merely examples, and other switching frequency values can also be used to achieve improved power efficiency.

As the charge on the battery decreases, the switching frequency can also decrease (e.g., continuously, in steps, linearly, exponentially, and/or otherwise) to maintain substantially the same output ripple level or to maintain a ripple level that is below an acceptable threshold level. Improved results relative to a conventional constant switching frequency power converter can also be achieved without varying switching frequency as the battery charge decreases by simply using different switching frequencies when connected to AC power than when connected to battery power, although varying the switching frequency with battery charge generally provides greater power savings. In some implementations, the nominal switching frequency can be set based on the voltage provided by the AC adapter and can be lowered proportional to input voltage when operated on a lower battery voltage.

The output ripple level of a buck converter is a function of the input voltage ($V_{in}$) and the switching frequency ($F_{sw}$). Current ripple $\Delta I_L$ from an inductor in an LC filter 265 can be expressed as:

$$\Delta I_L = \frac{V_o(1-D)}{L}T, \quad (1)$$

where L is the inductance, T is the switching period (i.e., $1/F_{sw}$), $V_O$ is the output voltage, and D is the duty cycle, which corresponds to the proportion of output voltage to input voltage ($V_O/V_{in}$). Assuming the power converter has enough bulk capacitors, the output voltage ripple ΔV can be expressed as:

$$\Delta V = R_{ESR} \cdot \Delta I_L, \quad (2)$$

where $R_{ESR}$ is the equivalent series resistance of the capacitor in the LC filter 265. By substituting for the current ripple $\Delta I_L$ in equation (1), the output voltage ripple can be expressed as:

$$\Delta V = R_{ESR} \cdot \frac{V_o(1-D)}{L}T. \quad (3)$$

By substituting $F_{sw}$ (switching frequency) for T (switching period):

$$\Delta V = R_{ESR} \cdot \frac{V_o(1-D)}{L \cdot F_{sw}}. \quad (4)$$

As the battery discharges, the duty cycle D increases to maintain a constant output voltage $V_O$. In the equation (4), as (1−D) decreases, the smaller (1−D) value creates an opportunity to lower the switching frequency $F_{sw}$ without deteriorating the output ripple ΔV (and/or $\Delta I_L$). For example, a typical notebook computer's battery pack has a discharge range from 16.8V to 12V, which is roughly a 20% battery voltage drop at the power converter input rail. At the same time, the switching frequency $F_{sw}$ may also decrease by a corresponding amount. Thus, the output voltage ripple ΔV (and, similarly, the output current ripple $\Delta I_L$) can be maintained at the same level in accordance with equation (4).

Figure 2:
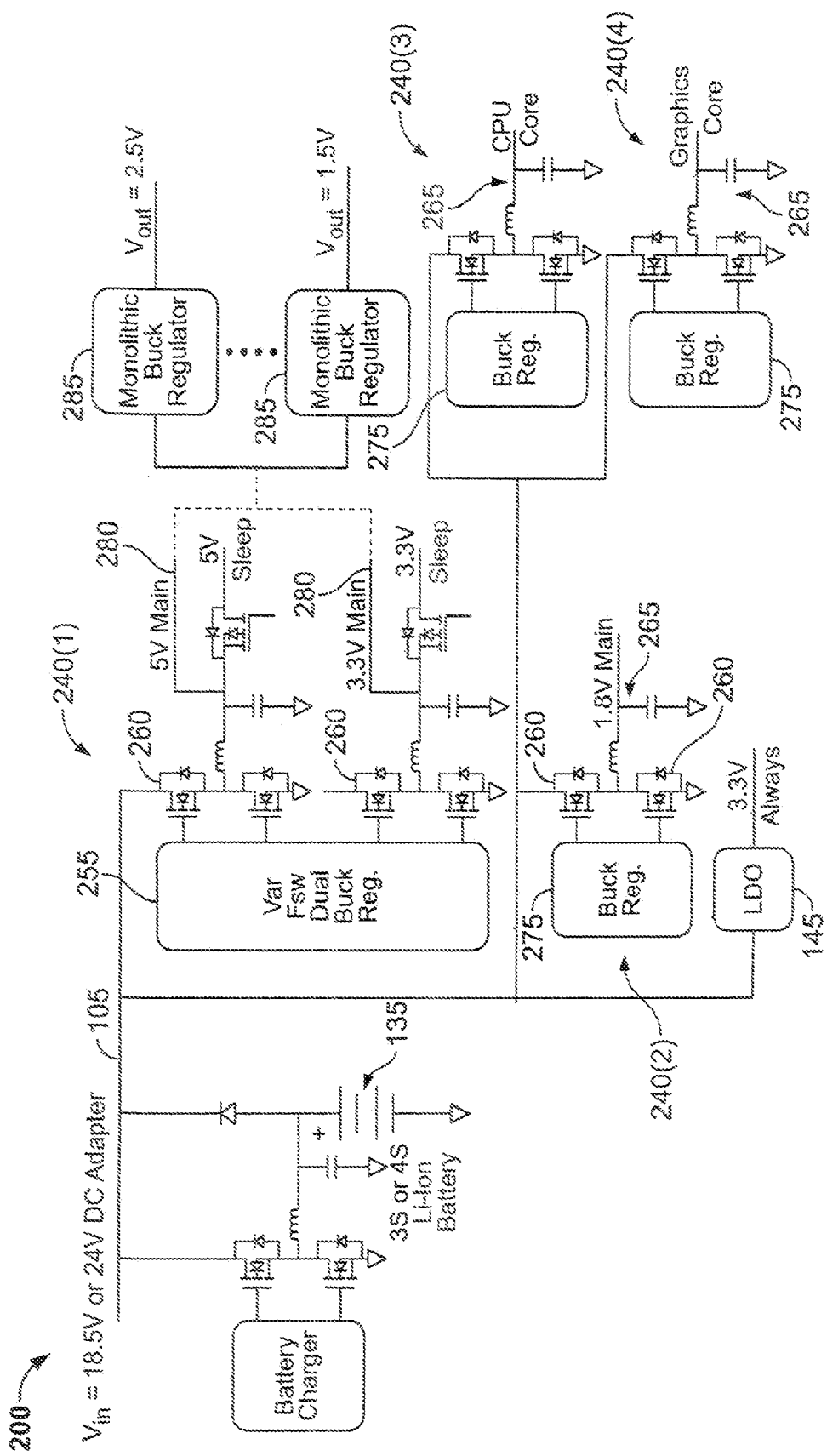
FIG. 2 is a block diagram of a variable switching frequency power converter system for a notebook computer or other device.

FIG. 2 is a block diagram of a variable switching frequency power converter system 200 for a notebook computer or other device. The power converter system 200 is similar to the power converter system 100 of FIG. 1 but includes buck converters 240 that implement variable switching frequencies depending upon a voltage level on the input voltage rail 105. Each buck converter 240 includes a variable switching frequency buck regulator 255 or 275, FETs 260 (or other transistors or switches), and one or more LC filters 265. The operation of the buck converters 240 is the same as the buck converters 140 described in connection with FIG. 1 except that the buck regulators 255 and 275 implement variable switching frequencies.

The variable level of the switching frequency can be controlled by a digital signal processor, software, and/or a hardware-implemented controller, which can be integrated into the buck regulator 255 or 275 or provided as a separate component. For example, a variable switching frequency feature can be implemented into a pulse-width modulation (PWM) controller of a buck converter 240. When the controller detects an input power rail drop, the controller can change a switching frequency of a built-in oscillator to lower power losses. In addition, control of the variable level of the switching frequency can be responsive to changes in the input voltage (e.g., using a conversion table of input voltage to switching frequency or a conversion algorithm that calculates switching frequency for a given input voltage). Alternatively, control of the variable level of the switching frequency can be responsive to changes in the output ripple level (e.g., using a feedback loop that enables the switching frequency to be adjusted to prevent any substantial drift in the output current and/or voltage ripple level). To further decrease switching losses, the variable level of the switching frequency can also be dependent upon the load at the output of the buck converter 240. For lighter loads, the switching frequency can be decreased. Thus, the switching frequency can be a function of the input voltage level, the output current or load level, the output ripple level, and/or other factors.

Because switching frequency is proportional to switching losses, the increase in switching efficiency obtained using a varied switching frequency is dependent upon the amount of change in the switching frequency. Thus, a change in switching frequency from 300 KHz to 240 KHz during battery discharge will typically result in greater power savings than a change from 300 KHz to 275 KHz. Rearranging equation (1), substituting for the duty cycle D, using K to replace the constant values, the switching frequency f can be represented by:

$$f = \frac{V_o\left(1 - \frac{V_o}{Vin}\right)}{L \cdot \Delta I_L} = K \cdot \left(1 - \frac{V_o}{Vin}\right). \quad (5)$$

From equation (5), the frequency change becomes less significant with smaller output voltages $V_O$. For example, in an extreme case, when $V_O$ is equal zero, input voltage changes have no impact on switching frequency. In a typical notebook computer, the core voltage supply for the CPU (as provided by a buck converter 240(3)) consumes significant amounts of power, but the core voltage is normally low, for example, 1.2 V. This relatively low output voltage from the buck converter 240(3) generates a less significant frequency variation as the battery voltage drops relative to buck converters 240 that provide higher output voltages. In addition, the core voltage generally requires a low voltage deviation during transient response, so a lower switching frequency deteriorates transient response performance.

Additional gains in efficiency can be achieved using a two-stage power conversion architecture. The two-stage power conversion architecture uses a first buck converter 240(1) as a first power conversion stage to convert the voltage on the input voltage rail 105 to an intermediate voltage (e.g., 5 V or 3.3 V) on an intermediate voltage rail 280. Other intermediate voltage levels can also be used. For example, a level of six or seven volts may achieve slightly better efficiency. The selection of the voltage level on the intermediate rail 280 is related to factors such as switching frequency, input voltage, output voltage, and MOSFET switches. One or more secondary buck converters 285 are then used to convert the intermediate voltage to an output voltage (e.g., 2.5 V or 1.5 V). The secondary buck converters 285 can be point-of-load (POL) converters that are small and can be located close to the load. Assuming sufficiently low load currents at the output, it is possible to use monolithic buck regulators 285 that include built-in FETs. In addition, relatively lower load currents enable better efficiency in the second conversion stage (and thus the overall conversion). Accordingly, in some implementations, a single stage converter can power higher current rails, such as a core CPU voltage rail, while lower current rails use a two-stage converter. Furthermore, the intermediate voltage rail for the second conversion stage can also be used, for example, to provide the core CPU voltage.

From equation (4) and assuming a 5 V intermediate voltage, when the input voltage on input voltage rail 105 drops from 12.8V to 9V, the switching frequency can be cut down 28% to maintain the same output current ripple level at the intermediate rail 280. A 28% reduction in switching frequency can significantly alleviate switching losses. An intermediate voltage (e.g., of 5 V) can also reduce switching losses at the second stage conversion by creating an opportunity to use an integrated buck regulator 285, possibly at a higher switching frequency, to obtain a smaller solution size. Moreover, a high switching frequency enables the size of the monolithic buck converter system to be reduced. In addition, use of higher switching frequencies for an integrated buck regulator 285, at least on lower current rails, makes less of an impact on overall efficiency. A secondary buck regulator 285, for example, can provide auxiliary voltages, which tend to be provided on rails that have lower current demands. A relatively high switching frequency (e.g., higher than the switching frequency of the first-stage power converter) of the auxiliary voltage power converter speeds up transient response and enables use of a relatively small magnetic device. Furthermore, as components that use lower (e.g., sub-1 V) operating voltages are developed and/or implemented, use of a two-stage conversion architecture can provide significant efficiency gains relative to a single stage power converter 240. In some cases, core CPU voltage and/or other output voltages can be provided by the two-stage conversion architecture. Under typical usage patterns (e.g., word processing, surfing the Internet, using email applications, and playing DVDs), notebook computers spend most of their operating time using a relatively small percentage of the rated power. Under such conditions, the majority of power loss results from switching losses. Accordingly, by reducing switching losses, the two-stage conversion architecture can provide a significant improvement in efficiency during normal modes of operation.

Using 5 V, 3.3 V, or some other intermediate voltage instead of 12.8 V as an input voltage for auxiliary or core voltage power converters and other POL converters 285 allows use of low voltage rating MOSFETs, which normally have better conduction resistance and gate charge ratings compared to high voltage rating MOSFETs. An intermediate voltage also balances the thermal performance of the core voltage power converter and other POL converters 285. A conventional single stage power conversion approach has a narrow duty cycle that causes uneven power dissipation between high side and low side MOSFETs. A two-stage power conversion approach alleviates conduction loss at the low side switch. Furthermore, use of an intermediate voltage creates an opportunity to use fully integrated buck converter. In the commercial market, semiconductor vendors offer tiny package buck converters, which typically have a maximum input voltage 5V. For each power rail, based on operation requirements of particular ASICs or other integrated circuits (ICs), several converters can be used, even for same operation voltage. Each converter can be dedicated to a specified load IC. In sleep mode, instead of using a series of switches to shut down the load, a power management IC can disable an idle load through an enable pin of the power converter controllers. This architecture can dramatically reduce series switch loss.

Figure 3:
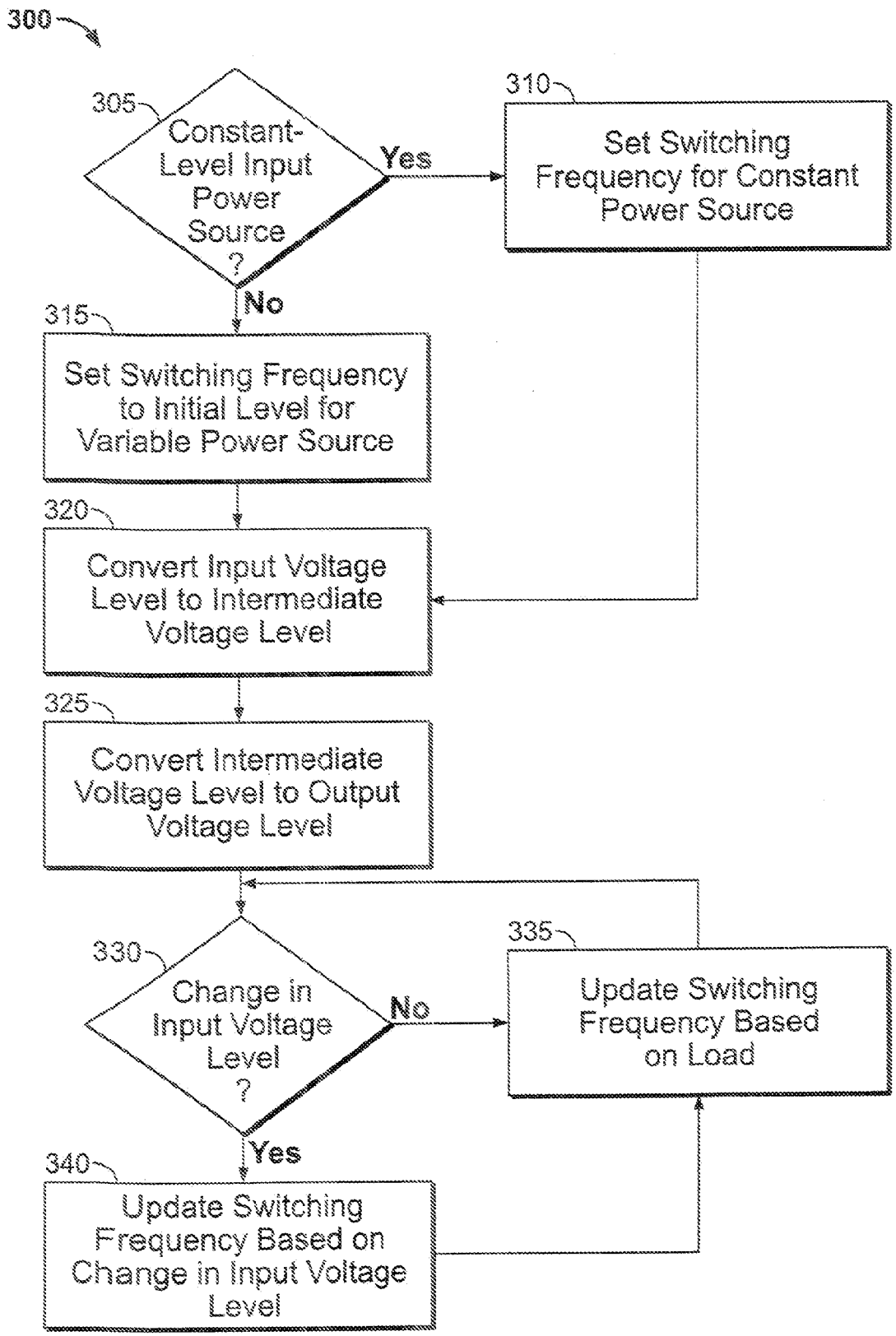
FIG. 3 is a flow diagram of a process for varying a switching frequency of a power converter in a portable device.

FIG. 3 is a flow diagram of a process 300 for varying a switching frequency of a power converter in a portable device. A determination is made (305) whether an input power supply is provided by a constant power source (e.g., a DC voltage from an AC adapter or a battery that is constantly recharged or that otherwise provides a constant voltage level over time) or a power source that varies over time (e.g., a voltage from a rechargeable lithium-ion battery). If the input power supply is provided by a constant power source, a switching frequency of a power conversion operation is set (310) to a predetermined level corresponding to the voltage level provided by the constant power source.

If the input power supply is determined to be time varying, the switching frequency of the power conversion operation is set (315) to an initial level corresponding to the present voltage level provided by the time-varying power source. In some cases, the time-varying power source may, for example, initially provide the same voltage level as the constant power source. In such a case, the initial switching frequency level may be the same as the switching frequency level that corresponds to the level of the constant power source. In other cases, the time-varying power source may have a lower voltage level than the constant power source. Accordingly, the initial switching frequency level may be lower than the switching frequency level that corresponds to the level of the constant power source.

The input voltage level is converted (320) to an intermediate voltage level using the appropriate switching frequency level. The conversion is made by a buck converter, for example, in a first stage of a two-stage power converter. The intermediate voltage level is generally a constant voltage even when the input voltage level includes a time-varying voltage and is maintained at a constant level by varying a duty cycle of the switched input voltage. The intermediate voltage level is converted (325) to an output voltage level in a second stage of the two-stage power converter. Generally, the output voltage level is a voltage that is lower than a voltage of the intermediate voltage level.

A determination (330) is made whether the input voltage level has changed. The determination can be made by detecting a change in the input voltage or by detecting a change (e.g., a reduction) in the output ripple that can be attributed to a change in the input voltage. Typically, the change in the input voltage level occurs as the battery charge is depleted (or when switching from AC power to battery power). If there is no change in the input voltage level, the switching frequency is optionally altered (335) based on any changes in a load (e.g., a current draw) at the output, and the process 300 continues monitoring (330) for a change in the input voltage.

If it is determined that the input voltage level has changed, the switching frequency is altered (340). The alteration in the switching frequency can be performed to maintain a substantially consistent ripple for the intermediate voltage level or at the output (e.g., to maintain the ripple below an acceptable threshold but at a high enough level to allow reductions in switching frequency that provide meaningful efficiency gains). Alternatively, the amount of alteration in the switching frequency can be a function of the level or the amount of change in the input voltage level. In general, the input voltage level decreases as the battery charge is depleted, and the switching frequency is decreased proportionally or according to some other function of the input voltage level. Because batteries for portable devices typically have a range of operating voltages (e.g., from 16.8 V down to 12.0 V for a typical four cell battery), switching frequencies during battery discharge also have a corresponding range of switching frequencies (e.g., from 356 KHz at 16.8 V down to 294 KHz at 12.0 V), while the switching frequency that corresponds to the higher, constant voltage (e.g., 18.5 V or 24 V) provided by an AC adapter may be a switching frequency (e.g., 400 KHz) that is outside of the range. In addition to altering the switching frequency based on the change in input voltage level, the switching frequency may also be altered (335) based on any changes in a load (e.g., a current draw) at the output, and the process 300 continues monitoring (330) for a change in the input voltage.

Various implementations of the systems and techniques described here can be realized in digital electronic circuitry, integrated circuitry, specially designed ASICs (application specific integrated circuits), computer hardware, firmware, software, and/or combinations thereof. For example, controllers and other modules, components, and algorithms described above can be implemented in software. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of implementations have been described. Nevertheless, it will be understood that various modifications may be made. For example, other types of multiple stage power converters can be used. In addition, processing operations described in FIG. 3, such as those associated with reference numerals 335 and 340, can be performed is a different order than shown and described or can be performed simultaneously. Accordingly, other implementations are within the scope of the following claims.

What is claimed is:

1. A method, comprising:
converting an input voltage from a battery to a voltage at an output using a two-stage conversion to convert the input voltage to a first voltage and to convert the first voltage to a second voltage;
detecting a change in the input voltage from the battery; and
altering a switching frequency in the two-stage conversion based, at least in part, on the change in the input voltage from the battery, wherein the altered switching frequency improves power efficiency relative to use of a constant switching frequency.

2. The method of claim 1, wherein altering the switching frequency is performed in response to a detected change in the voltage level of the input voltage to maintain a substantially consistent ripple at the output.

3. The method of claim 1, wherein altering the switching frequency is performed in response to a detected change in the ripple at the output to maintain a substantially consistent ripple at the output.

4. The method of claim 1, wherein altering the switching frequency comprises decreasing the switching frequency with decreases in the input voltage.

5. The method of claim 1, further comprising altering the switching frequency based, at least in part, on a load at the output.

6. The method of claim 1, wherein altering a switching frequency comprises altering a switching frequency to maintain a substantially consistent ripple at the output and the voltage at the output comprises one of the first voltage or the second voltage.

7. The method of claim 6, wherein the first voltage and the second voltage are maintained at a substantially constant level, and the first voltage has a higher level than the second voltage.

8. The method of claim 7, further comprising using a plurality of power converters to convert the first voltage to a plurality of secondary voltages, each secondary voltage adapted to power at least one component.

9. The method of claim 1, further comprising maintaining a substantially constant voltage at the output by varying a duty cycle associated with the switching frequency.

10. The method of claim 1, further comprising:
altering the switching frequency within a range of switching frequencies as the input voltage changes with a battery charge; and
maintaining a constant switching frequency different from the range of switching frequencies when maintaining the input voltage at a constant level using a constant-level power source.

11. An article of manufacture comprising machine-readable instructions operable to cause data processing apparatus to:
detect a change in a power supply level of a battery; and
change a switching frequency of a power converter in response to the detected change in the power supply level from the battery, the power converter comprising a two-stage power converter operable to convert the power supply level to a voltage level at a first output and to convert the first output voltage level to a voltage level at a second output.

12. The article of claim 11 wherein the machine-readable instructions are further operable to cause data processing apparatus to:
determine whether a device powered is operating using the battery or using a constant-level power source;
control the switching frequency of the power converter within a first range of switching frequencies when the device is operating using the battery; and
activate at least one switching frequency different from the first range of switching frequencies when the device is operating using a constant-level power source.

13. The article of claim 11 wherein the switching frequency is changed to maintain a ripple level at an output of the power converter below a threshold level, the output comprising at least one of the first output or the second output.

14. The article of claim 11 wherein the power converter is operable to produce substantially constant voltages at each of the first output and the second output with changes in the power supply level.

15. A system comprising:

an input terminal;

an output terminal operable to power at least one component of a portable device;

a variable switching frequency power converter operable to convert a voltage from a battery at the input terminal to an intermediate voltage, wherein a switching frequency of the variable switching frequency power converter corresponds to the voltage level at the input terminal; and a second stage power converter operable to convert the intermediate voltage to produce an output voltage at the output terminal.

16. The system of claim 15, wherein the power converter comprises a buck regulator.

17. The system of claim 15, wherein the second stage power converter comprises a monolithic buck regulator.

18. A system comprising:

means for converting battery power from an input level to a different output level using a two-stage conversion; and means for varying a switching frequency based on a change in the input level of the battery power, the switching frequency associated with the means for converting power.

19. The system of claim 18 wherein the means for converting comprises:

means for converting the input level to an intermediate level; and means for converting the intermediate level to the output level, the output level different from the intermediate level, and the intermediate level and the output level each having substantially consistent levels.

20. The system of claim 18 wherein the means for converting comprises a buck converter.

21. The system of claim 18 wherein the means for varying comprises means for controlling the switching frequency to prevent a ripple at an output from exceeding a threshold, the output associated with at least one stage of the two-stage conversion.

22. The system of claim 18 wherein the means for varying comprises means for operating at a different switching frequency when the power comprises a time-varying voltage level than when the power comprises a constant voltage level.

* * * * *